US011514805B2

(12) United States Patent
Olivieri et al.

(10) Patent No.: US 11,514,805 B2
(45) Date of Patent: Nov. 29, 2022

(54) EDUCATION AND TRAINING SESSIONS

(71) Applicant: International Business Machines Corporation, Armonk, NY (US)

(72) Inventors: Ricardo N. Olivieri, Brooklyn, NY (US); Leigh Williamson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 256 days.

(21) Appl. No.: 16/299,137

(22) Filed: Mar. 12, 2019

(65) Prior Publication Data

US 2020/0294408 A1 Sep. 17, 2020

(51) Int. Cl.
*G09B 5/12* (2006.01)
*G06F 11/34* (2006.01)
*G06F 3/01* (2006.01)

(52) U.S. Cl.
CPC .............. *G09B 5/12* (2013.01); *G06F 3/011* (2013.01); *G06F 11/3438* (2013.01)

(58) Field of Classification Search
CPC ........................................................ G09B 5/12
USPC ......................................................... 434/362
See application file for complete search history.

(56) References Cited

U.S. PATENT DOCUMENTS

| | | | | |
|---|---|---|---|---|
| 5,377,100 A * | 12/1994 | Pope | .................... | A61B 5/0476 600/545 |
| 10,013,892 B2 * | 7/2018 | Aslan | ...................... | G09B 5/08 |
| 10,127,825 B1 * | 11/2018 | Nguyen | ............... | A61B 5/0476 |
| 10,706,732 B1 * | 7/2020 | Hall | ......................... | G09B 5/00 |
| 2004/0230549 A1 * | 11/2004 | Freer | .................... | A61B 5/0482 706/61 |
| 2007/0188901 A1 * | 8/2007 | Heckerman | ............ | G09B 19/00 360/23 |
| 2008/0275358 A1 * | 11/2008 | Freer | ....................... | G09B 7/02 434/236 |
| 2011/0066005 A1 | 3/2011 | Rotenberg | | |
| 2011/0154266 A1 * | 6/2011 | Friend | .................. | G09B 21/009 715/863 |
| 2012/0231437 A1 * | 9/2012 | Fakhrai | .................... | G09B 7/00 434/350 |
| 2012/0237920 A1 | 9/2012 | Ho et al. | | |

(Continued)

OTHER PUBLICATIONS

Falcon, Alvaris, "8 Mind-Blowing Gadgets You Can Control Just With Your Brain", Hongkiat, https://www.hongkiat.com/blog/brain-controlled-gadgets/, [retrieved Mar. 10, 2019].

(Continued)

*Primary Examiner* — Thomas J Hong
(74) *Attorney, Agent, or Firm* — Jeffrey S LaBaw; Anthony V Englind; Randy Tejeda

(57) ABSTRACT

Embodiments generally relate to improving education and training sessions. In some embodiments, a method includes determining an attentiveness level associated with a first user during a learning session. The method further includes determining one or more drops in the attentiveness level during the learning session. The method further includes tracking inattentiveness information associated with the one or more drops in the attentiveness level. The method further includes performing one or more corrective actions in response to the one or more drops in the attentiveness level based at least in part on the inattentiveness information.

17 Claims, 4 Drawing Sheets

(56) References Cited

U.S. PATENT DOCUMENTS

| | | | | |
|---|---|---|---|---|
| 2013/0260361 | A1* | 10/2013 | Mutlu | A61B 5/0482 434/365 |
| 2014/0143352 | A1* | 5/2014 | Yegnashankaran | H04L 67/306 709/206 |
| 2014/0344702 | A1* | 11/2014 | Edge | G06Q 10/1091 715/730 |
| 2014/0347265 | A1 | 11/2014 | Aimone et al. | |
| 2015/0179087 | A1* | 6/2015 | Chen | G06K 7/10297 340/539.11 |
| 2015/0213725 | A1* | 7/2015 | Huntley | A61B 5/168 345/156 |
| 2015/0279227 | A1* | 10/2015 | Huber | G09B 7/02 434/353 |
| 2016/0203726 | A1 | 7/2016 | Hibbs et al. | |
| 2016/0225275 | A1* | 8/2016 | Wood | G09B 5/065 |
| 2017/0345109 | A1* | 11/2017 | Cejnar | G09B 7/00 |
| 2017/0358232 | A1* | 12/2017 | Adams | A61B 5/1118 |
| 2018/0197425 | A1* | 7/2018 | Lamb | A61B 5/6891 |
| 2018/0301053 | A1* | 10/2018 | Boccanfuso | A63H 3/006 |
| 2019/0212811 | A1* | 7/2019 | Moncomble | A61B 5/168 |
| 2019/0295022 | A1* | 9/2019 | Daniels | G06F 16/4393 |
| 2019/0295430 | A1* | 9/2019 | Yang | G09B 5/08 |
| 2019/0325769 | A1* | 10/2019 | Sehbai | G06F 1/263 |
| 2019/0371189 | A1* | 12/2019 | Hiraide | G06V 40/172 |
| 2020/0135045 | A1* | 4/2020 | Alyuz Civitci | G06K 9/6293 |
| 2020/0226941 | A1* | 7/2020 | Kakaraparthy | G06N 20/00 |
| 2021/0012675 | A1* | 1/2021 | Han | G16H 50/20 |
| 2021/0232577 | A1* | 7/2021 | Ogawa | G06K 9/00335 |

OTHER PUBLICATIONS

Neurowear, "Neuro Turntable", Neurowear, http://neurowear.com/projects_detail/neuro_turntable.html, [retrieved Mar. 10, 2019].

* cited by examiner

EDUCATION AND TRAINING SESSIONS

BACKGROUND

In-person classes, online courses, and videos are commonly used as mediums to deliver training and education materials to students and employees. Many organizations require their team members to watch videos and/or take online courses for work performance, as well as for certification for critical and sensitive topics such as security policies, business ethics, etc. Though these are great ways for delivering educational content, in many cases people do not pay full attention to the materials presented to them. People get distracted by emails, text messages, work, among many other distractions.

SUMMARY

Disclosed herein is a method for improving education and training sessions, and a system and a computer program product as specified in the independent claims. Embodiments are given in the dependent claims. Embodiments can be freely combined with each other if they are not mutually exclusive.

In an embodiment, a method includes determining an attentiveness level associated with a first user during a learning session. The method further includes determining one or more drops in the attentiveness level during the learning session. The method further includes tracking inattentiveness information associated with the one or more drops in the attentiveness level. The method further includes performing one or more corrective actions in response to the one or more drops in the attentiveness level based at least in part on the inattentiveness information.

In another embodiment, the inattentiveness information associated with the one or more drops in the attentiveness level includes one or more of times, one or more durations, and one or more topics. In another aspect, the at least one processor further performs operations including: determining one of an active mode and a passive mode; and performing one or more corrective actions in response to the one or more drops in the attentiveness level based on the determining of the active mode and a passive mode. In another aspect, the at least one processor further performs operations including alerting the user to the one or more drops in the attentiveness level. In another aspect, the method further includes: generating one or more suggested actions to the user; and providing the one or more suggested actions to the user. In another aspect, the method further includes: aggregating the inattentiveness information associated with the one or more drops in the attentiveness level associated with a plurality of users; and generating a report that includes the inattentiveness information. In another aspect, the method further includes generating a report that includes one or more suggestions for improving attentiveness levels.

DETAILED DESCRIPTION

Embodiments described herein improve education and training sessions. As described in more detail herein, embodiments respond to the inattentiveness of a user during education and training sessions.

In various embodiments, a system monitors the attentiveness level associated with a user during a learning session, which may be educational in nature for students or employees, or may be training for employees, or may be training for students who have practical classes and training, etc. The system also monitors one or more drops in the attentiveness level during the learning session. The system further tracks inattentiveness information associated with the one or more drops in the attentiveness level. In response to the one or more drops in the attentiveness level, the system performs one or more corrective actions in response to the drops based on the inattentiveness information. For example, the system may alert the user in real-time when the user's attentiveness drops. The system may also make corrective action suggestions to the user or to a staff member. Such corrective actions facilitate the user in maintaining attentiveness and also avoid the user finding out too late that the user failed to grasp particular concepts and materials due to inattentiveness.

Figure 1:
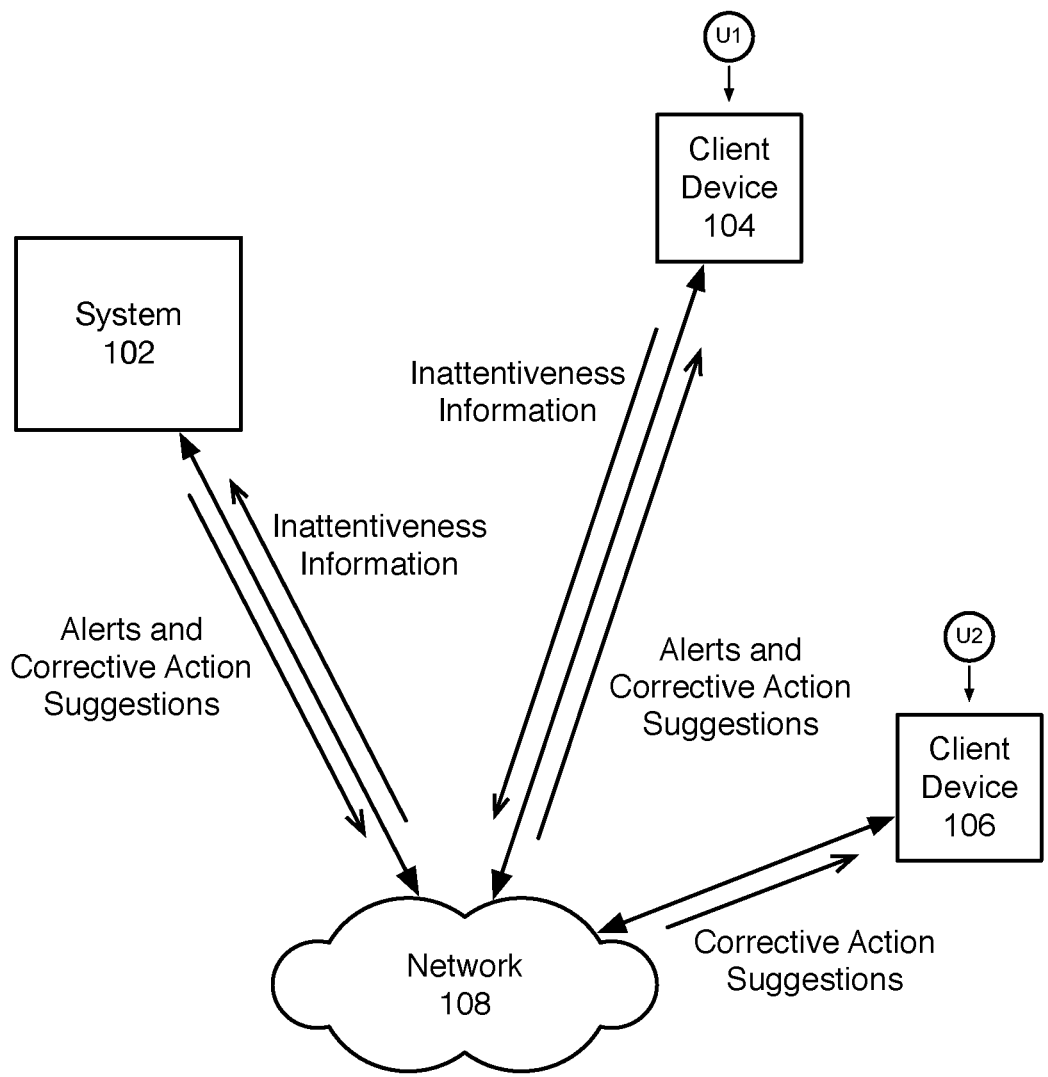
FIG. 1 is a block diagram of an example environment for improving education and training sessions, which may be used for some implementations described herein.

FIG. 1 is a block diagram of an example environment 100 for improving education and training sessions, which may be used for some implementations described herein. In some implementations, environment 100 includes a system 102, which communicates with one or more client devices such as client devices 104 and 106. Environment 100 also includes a network 108 through which system 102 and client devices 104, 106, etc. communicate. Network 108 may be any suitable communication network such as a Wi-Fi network, Bluetooth network, the Internet, etc., or any combination thereof.

As described in more detail herein, a user such as user U1 may participate in a learning session, which may be an education and training session associated with school, work, etc. The learning session may be online or in person. In various embodiments, during a learning session, system 102 monitors the attentiveness level associated with one or more users such as user U1 via client device 104. System 102 also monitors any drops in the attentiveness level during each learning session and tracks inattentiveness information associated with the drops in the attentiveness level. The system may monitor the attentiveness level and drops in the attentiveness level via client device 104, which has one or more sensor devices for monitoring the attentiveness level.

In response to the one or more drops in the attentiveness level, system 102 performs one or more corrective actions in response to the drops in the attentiveness level and based on the inattentiveness information. For example, if system 102 is in an active mode, system 102 may perform a corrective action by sending the user alerts to inform the user of any drops in the attentiveness level. In various embodiments, system 102 delivers such alerts to the user immediately, in real-time so that the user may refocus and pay attention during the learning session. In various embodiments, the system may generate and provide one or more suggested corrective actions to the user. For example, a suggested corrective action may be to take a brief break, etc.

In another example, if system 102 is in a passive mode, system 102 may perform a corrective action by aggregating the inattentiveness information associated with the one or more drops in the attentiveness level associated with a plurality of users. System 102 may then generate a report that includes the inattentiveness information. In various embodiments, system 102 may send the report, including suggested corrective action suggestions, to another user such as user U2 via client device 106. Such a user may be, for example, a teacher or facilitator who is running the learning session, a manager who supervises the user participating in the learning session, etc. Further embodiments directed to the generation and conducting of the surveys are described in more detail herein.

For ease of illustration, FIG. 1 shows one block for each of system 102, client devices 104 and 106, and network 108. Blocks 102, 104, 106, and 108 may represent multiple systems, client devices, and multiple networks. In other implementations, environment 100 may not have all of the components shown and/or may have other elements including other types of elements instead of, or in addition to, those shown herein.

In various embodiments, environment 100 may be associated with, for example, a school campus, a corporation campus, etc. Environment 100 may represent other environments such as a municipal campus, etc., and will depend on the particular embodiment.

While system 102 performs embodiments described herein, in other embodiments, any suitable component or combination of components associated with system 102 or any suitable processor or processors associated with system 102 may facilitate performing the embodiments described herein.

Figure 2:
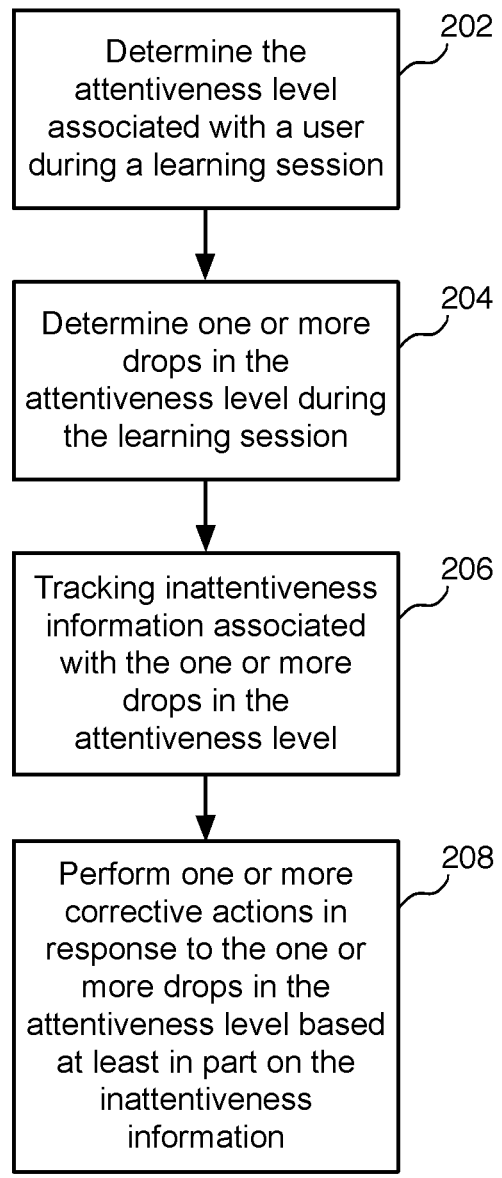
FIG. 2 is an example flow diagram for improving education and training sessions, according to some embodiments.

FIG. 2 is an example flow diagram for improving education and training sessions, according to some embodiments. Referring to both FIGS. 1 and 2, a method begins at block 202, where a system such as system 102 determines the attentiveness level associated with a first user during a learning session. In various embodiments, to determine the attentiveness level, system 102 may utilize various techniques and/or devices to measure the attentiveness and to determine an attentiveness values. Such devices may be integrated with the client device of the user. Further details of such devices are described in more detail below.

In various embodiments, the learning session may be associated with education and/or training. For example, in the context of education, the learning session may be in a school environment with students or in a business environment with employees. In the context of training, the learning session may be in a business environment for employees. In some embodiments, the learning session is an online course. In some embodiments, the learning session is an in-person course.

At block 204, the system determines one or more drops in the attentiveness level during the learning session. In various embodiments, the system monitors the attentiveness level during the learning session. The attentiveness level may fluctuate over time, depending on the users attentiveness level at each moment. System 102 detects whenever the attentiveness level drops below a predetermined threshold level.

As indicated above, the system may utilize various techniques and/or devices to measure the attentiveness level and to determine attentiveness values. The system may also utilize such devices to detect drops in attentiveness level. For example, in some embodiments, a particular device may detect whether the user is no longer paying attention. Another device may detect whether the user is paying attention to a particular video and/or audio being played.

In some embodiments, the system may utilize an augmented reality (AR) and/or virtual reality (VR) device that monitors the user and detects whether he or she is focused and paying attention to what is being presented. Such an AR/VR device may have an integrated "brain monitoring" component within it, which facilitates viewing and monitoring capabilities. The use of the AR/VR device with integrated brain monitoring functionality may make brain monitoring less of a distraction for the user and may also allow for more interesting and innovative course content delivery. Users (e.g., students, employees, etc.) wearing such an enhanced AR/VR device may view the learning material (e.g., videos, text, online courses, or live teacher) while the device monitors the user's brain for attentiveness or drops in attentiveness.

In various embodiments, the system records the different times and time intervals when the attentiveness level of the user drops below the predetermined threshold level. For instance, the system records that the user focused very well during the user's English and Spanish courses, but the user did not pay attention during the user's math course on a particular day.

For ease of illustration, some embodiments are described in the context of a single user. These embodiments and others may also apply to multiple users. For example, when a given a group of students attend different courses throughout the day, the system detects when any of the students are not paying attention and potentially may not have absorbed the course information.

At block 206, the system tracks inattentiveness information associated with the one or more drops in the attentiveness level. In various embodiments, the inattentiveness information associated with the one or more drops in the attentiveness level includes one or more of times, one or more durations, and one or more topics. In an example scenario, suppose the learning session is to be a part of a self-paced online course. The user may watch an educational video that his or her company requires for training or certification purposes. After an hour or so of watching the video, the user stops paying attention, and the user's mind wanders for about 10 minutes. At about an hour and half, the user may again stop paying attention for 15 minutes. The system determines and records each time and for how long the user's attentiveness level dropped below the predetermined threshold level. The system may also determine and record the topic and/or skill level being taught during the learning session.

At block 208, the system performs one or more corrective actions in response to the one or more drops in the attentiveness level based at least in part on the inattentiveness information. Such corrective actions or measures facilitate the user in maintaining attentiveness and also avoid the user finding out too late that the user failed to grasp particular concepts and materials due to inattentiveness.

In various embodiments, the system may be configured in two modes of operation—active mode or passive mode. In some embodiments, to perform the one or more corrective actions, the system determines if the system is in active mode or passive mode. As described in more detail herein, active mode enables the user to know immediately when the user stops paying attention, while passive mode enables the user to see all the instances at a later point in time when the user stopped paying attention, such as at the end of a learning session. The system performs one or more corrective actions in response to the one or more drops in the attentiveness level based on the determining of the active mode and a passive mode. Example embodiments are described below.

If the system is in an active mode, the system may perform a corrective action by alerting the user to the one or more drops in the attentiveness level. In various scenarios, the user as well as other participants in the learning session may not realize when and how many times they have drifted off during the learning session.

In various embodiments, the system may perform a corrective action by generating one or more suggested actions to the user. The system may then provide the one or more suggested actions to the user. For example, the system may recommend to the user that the user should review the material again for a particular lesson, where the user's attentiveness level dropped below a predetermined threshold. In some embodiments, the system may offer the user to play back the particular lesson.

In the active mode, if the materials are pre-recorded, the system may give the user the option to stop the learning session for the moment to continue with the learning session. Stopping the learning session may enable the user to take a break, for example. In some embodiments, the system may also recommend and offer the user a meditation exercise as a way to help the user to disconnect from his or her current thoughts that may distract from the learning session.

If the system is in a passive mode, the system may perform a corrective action by aggregating the inattentiveness information associated with the one or more drops in the attentiveness level associated with a plurality of users. The system aggregates the inattentiveness information for all users of a given learning session. The system may then generate a report that includes the aggregated inattentiveness information. The system may generate a report at a predetermined time (e.g., after a learning session is completed, etc.) or periodically (e.g., daily, weekly, monthly, etc.).

In various embodiments, the system may generate a report that also includes one or more suggestions for improving attentiveness levels. For example, the system may provide metrics to the teaching staff in order to help them improve the delivery of the course material. Such metrics may include each time, for how long, and for which topics each user was inattentive. For example, the report may indicate that multiple users were inattentive during 20 minutes of a specific learning session. This would indicate that the materials might need to be reworked for better presentation. Suggestions for improving attentiveness levels may also show how well those students who are taking advantage of the recommendations received from the system are doing. The teaching staff may observe that such students do better than those who did pay attention during particular times during the learning session.

The system may also make recommendations to the administrators that most users (e.g., students, employees, etc.) failed to stay engaged during certain learning sessions of certain topics. This is useful information that informs administrations and/or teachers how material might be adjusted for more effective engagement and focus of users. In some embodiments, the system may enable the user to provide feedback as to why the user's attention drifted off during the moments that the system marked as inattentive.

In some embodiments, in a passive mode, the system may also provide inattentiveness information and recommendations associated with a given user to that user. This would inform the user of any particular patterns on inattentiveness and possible recommendations for improvement. In the passive mode, the system may enable the user to select to review an entire course or to review the particular portions of the learning session where the user was inattentive.

In various embodiments, the system anonymizes the data gathered about individual student's attention, and stores such data in a database for aggregate analysis. The stored data may include the time when each student was inattentive, the length of inattentiveness, and a link or pointer to the exact location in the content material of the learning session that corresponds to the point of inattentiveness.

The system may use the data analytics applied to the aggregate student attention metrics in order to determine if multiple users stop paying attention around the same topics within a given learning session (e.g., lecture or course). The system may generate and deliver reports to faculty or staff members (e.g., teachers, principals, owners of the training materials, etc.) so they are aware of any potential trouble spots in the course flow. Such information allows faculty or staff members to modify course materials in order to keep users fully engaged.

In some embodiments, the system may track inattentiveness information associated with multiple versions of course materials and flows. As such, the system may compare student attention metrics associated with each version of alternative course materials and flows in order to quantitatively identify the most successful way to deliver the material and to best engage the students' attention. This embodiment is similar to how A/B testing with variants A and B, where web application deployments are compared in order to determine the best performing variant, only in our case the two variants are educational course delivery streams. A/B testing is also referred to as bucket tests or split-run testing.

The data analytics component correlates the data that the system gathers from users with how well the users are performing (e.g., academically, at work, etc.). For example, the system may generate reports to determine if there is a direct correlation between a user who loses focus very often and who also has an unsatisfactory overall performance rating (e.g., grades, performance reviews, etc.). Also, the system analyzes the data to determine if courses taught by a given professor are more prone to have students lose their focus/interest.

In some embodiments, for live courses, as all of the user's attention is being monitored, a threshold can be configured to alert the teacher/trainer that too many students are not paying attention. This gives the teacher/trainer the chance to make real-time course delivery adjustments and immediately explain the topic at hand in a different way. In some embodiments, the system may provide the user with real-time prompts so that the user could provide feedback to the lecturer as to how to improve the lecture.

Figure 3:
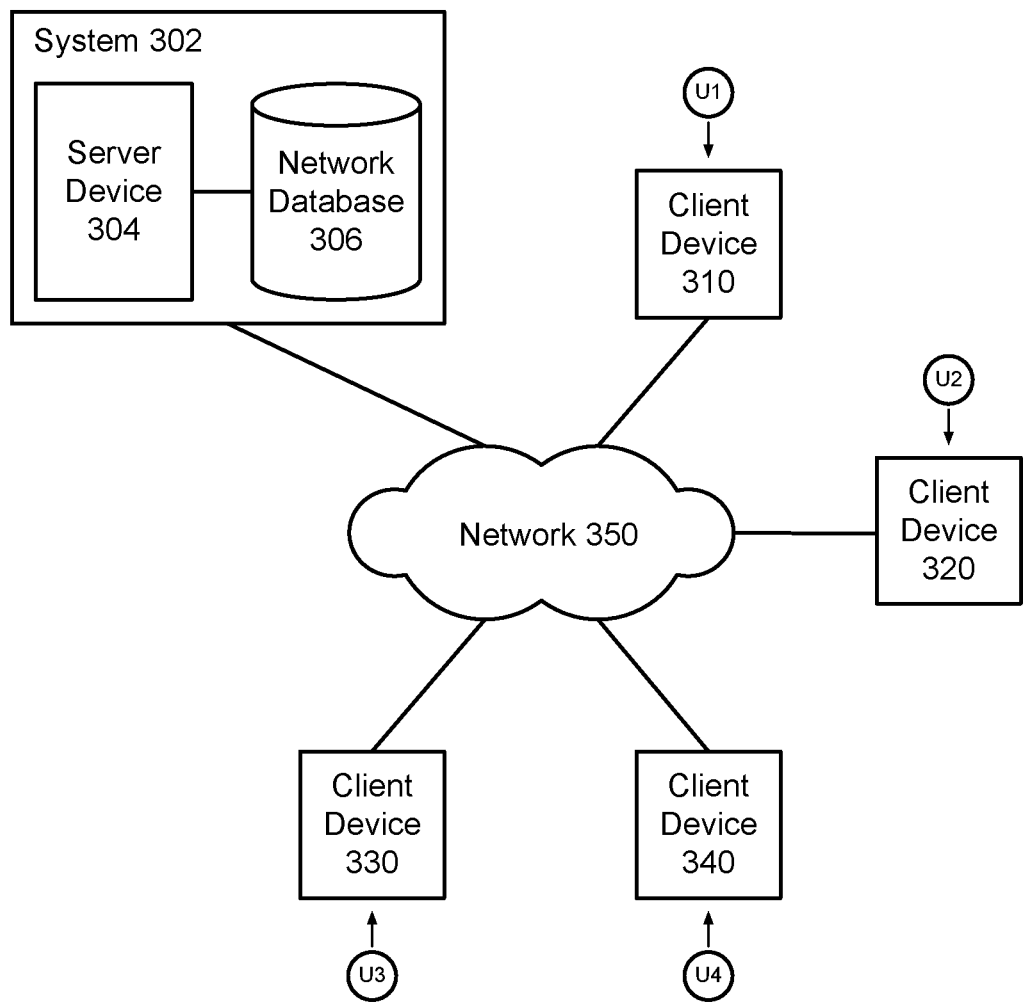
FIG. 3 is a block diagram of an example network environment for improving education and training sessions, which may be used for some implementations described herein.

FIG. 3 is a block diagram of an example network environment 300 for improving education and training sessions, which may be used for some implementations described herein. In some implementations, network environment 300 includes a system 302, which includes a server device 304 and a network database 306. Network environment 300 also includes client devices 310, 320, 330, and 340, which may communicate with system 302 and/or may communicate with each other directly or via system 302. Network environment 300 also includes a network 350 through which system 302 and client devices 310, 320, 330, and 340 communicate. Network 350 may be any suitable communication network such as a Wi-Fi network, Bluetooth network, the Internet, etc.

In various embodiments, during a learning session, system 302 monitors the attentiveness level associated with one or more users such as users U1, U2, U3, and U4, etc. via respective client devices 310, 320, 330, and 340. System 302 also monitors one or more drops in the attentiveness level during the learning session, and tracks inattentiveness information associated with the one or more drops in the attentiveness level. In response to the one or more drops in the attentiveness level, system 302 performs one or more corrective actions in response to the drops in the attentiveness level and based on the inattentiveness information.

For ease of illustration, FIG. 3 shows one block for each of system 302, server device 304, and network database 306, and shows four blocks for client devices 310, 320, 330, and 340. Blocks 302, 304, and 306 may represent multiple systems, server devices, and network databases. Also, there may be any number of client devices. In other implementations, environment 300 may not have all of the components shown and/or may have other elements including other types of elements instead of, or in addition to, those shown herein.

In various embodiments, environment 300 may be associated with, for example, a school campus, a corporation campus, etc. Environment 300 may represent other environments such as a municipal campus, etc., and will depend on the particular embodiment.

While server 304 of system 302 performs embodiments described herein, in other embodiments, any suitable component or combination of components associated with server 302 or any suitable processor or processors associated with server 302 may facilitate performing the embodiments described herein.

Figure 4:
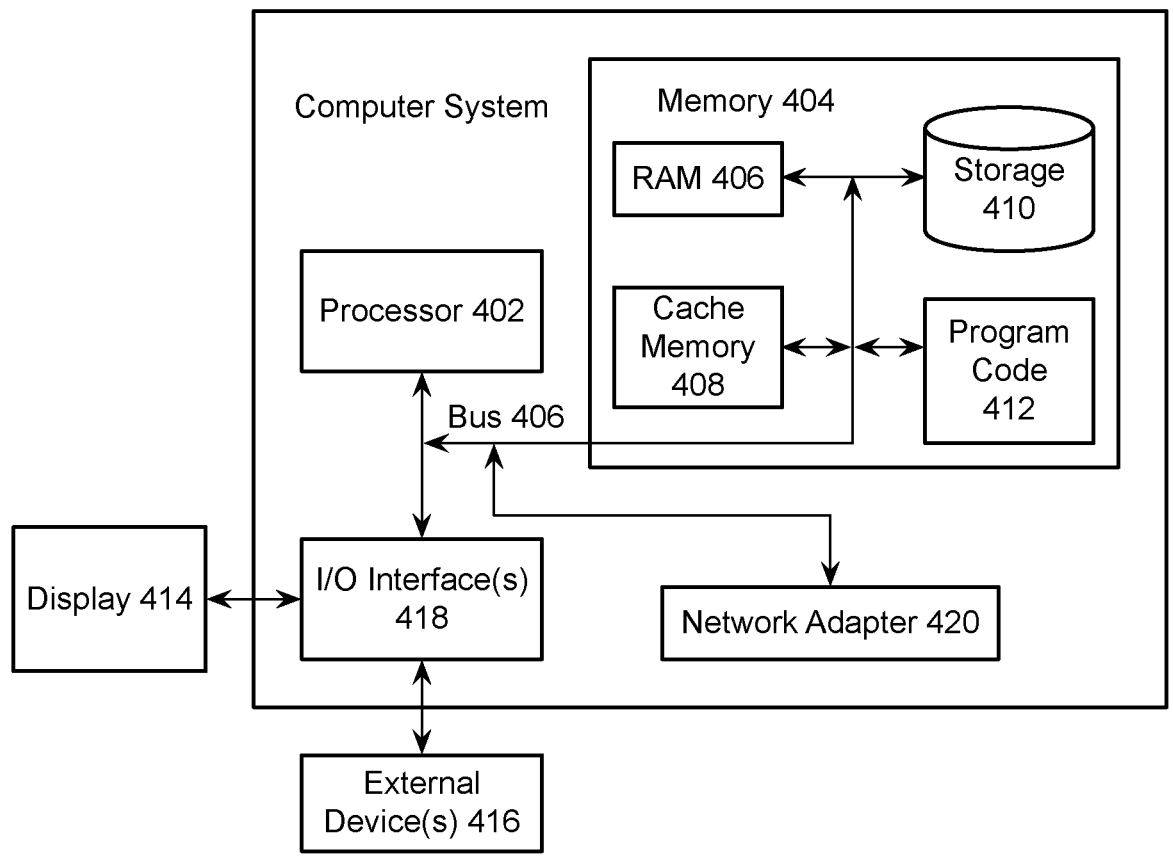
FIG. 4 is a block diagram of an example computer system, which may be used for embodiments described herein.

FIG. 4 is a block diagram of an example computer system 400, which may be used for embodiments described herein. For example, computer system 400 may be used to implement system 102 and/or server device 304 of FIG. 1, as well as to perform embodiments described herein. Computer system 400 is operationally coupled to one or more processing units such as processor 402, a memory 404, and a bus 406 that couples to various system components, including processor 402 and memory 404. Bus 406 represents one or more of any of several types of bus structures, including a memory bus, a memory controller, a peripheral bus, an accelerated graphics port, a processor or local bus using any of a variety of bus architectures, etc. Memory 404 may include computer readable media in the form of volatile memory, such as a random access memory (RAM) 406, a cache memory 408, and a storage unit 410, which may include non-volatile storage media or other types of memory. Memory 404 may include at least one program product having a set of at least one program code module such as program code 412 that are configured to carry out the functions of embodiments described herein when executed by processor 402. Computer system 400 may also communicate with a display 414 or one or more other external devices 416 via input/output (I/O) interface(s) 418. Computer system 400 may also communicate with one or more networks via network adapter 420. In other implementations, computer system 400 may not have all of the components shown and/or may have other elements including other types of elements instead of, or in addition to, those shown herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system for conducting a computer based presentation comprising:
   a plurality of geographically distributed client devices, at least a subset of the client devices each comprising at least one processor and a computer readable storage medium having program instructions embodied therewith and a sensor for measuring attentiveness of a respective one of a plurality of users, at least one computer readable storage medium in the system containing the program instructions executable by the system to cause the system to perform operations comprising:
   using measurements provided by respective sensors of the subset of the client devices for determining respective attentiveness levels each associated with respective ones of the plurality of users during a learning session;
   determining one or more drops in the attentiveness levels of at least one of the plurality of users during the learning session;
   tracking inattentiveness information associated with the one or more drops in the attentiveness levels;
   determining whether the system is in either a passive mode or an active mode and
   automatically sending one or more corrective actions to at least one client device in response to the determination of the one or more drops in the attentiveness levels, the inattentiveness information and the determination whether the system is in a passive mode or in an active mode, wherein a timing of the corrective action is dependent on whether the system is in the passive or active mode,
   wherein a second client device includes one of an augmented reality device or a virtual reality device equipped with a brain monitoring sensor, wherein the system is determined to be in the active mode and the system further performs operations comprising alerting a respective one of the plurality of users immediately after the brain monitoring sensor detects a current drop of the one or more drops in the attentiveness level.

2. The system of claim 1, wherein the inattentiveness information associated with the one or more drops in the attentiveness level is stored in a database and comprises one or more of times that respective ones of the one or more drops occurred, one or more durations of respective ones of the one or more drops, and one or more topics of the learning session during which respective ones of the one or more drops occurred, wherein the stored data for a respective drop the inattentiveness information includes the time, duration and topic.

3. The system of claim 1, wherein the system further performs operations comprising: generating one or more suggested actions to the respective one of the plurality of users; and providing the one or more suggested actions to the respective one of the plurality of users.

4. The system of claim 1, wherein the system further performs operations comprising:
   determining that the system is in the passive mode;
   anonymizing the inattentiveness information;
   aggregating the anonymized inattentiveness information associated with the one or more drops in the attentiveness level associated with the plurality of users;
   using the anonymized inattentiveness information to identify points in the learning session when multiple users were inattentive;
   determining that the learning session has ended; and after the learning session has ended, generating and sending a report that includes the anonymized inattentiveness information and the identified points.

5. The system of claim 1, wherein the system further performs operations comprising:
   determining that the system is in the active mode;
   determining that a threshold number of users have a current drop in attentiveness level; and
   responsive to determining that the threshold number of users have a current drop in attentiveness level, automatically and immediately sending an alert to a user conducting the learning session that includes one or more suggestions for improving attentiveness levels.

6. A computer program product for conducting a computer based presentation comprising a computer readable storage medium having program instructions embodied therewith, the program instructions executable by a system communicating with a plurality of geographically distributed client devices each client device including a sensor for measuring attentiveness of a respective one of a plurality of users, the system comprising at least one processor, the program instructions to cause the at least one processor to perform operations, comprising:
   using measurements provided by respective sensors of the plurality of geographically distributed client devices for determining respective attentiveness levels each associated with respective ones of the plurality of users during a learning session;
   determining one or more drops in the attentiveness levels of at least one of the plurality of users during the learning session;
   tracking inattentiveness information associated with the one or more drops in the attentiveness levels;
   determining whether the system is in either a passive mode or an active mode and
   automatically sending one or more corrective actions to at least one client device in response to the determination of the one or more drops in the attentiveness levels, the inattentiveness information and the determination whether the system is in a passive mode or in an active mode, wherein a timing of the corrective action is dependent on whether the system is in the passive or active mode,
   wherein a second client device includes one of an augmented reality device or a virtual reality device equipped with a brain monitoring sensor, wherein the system is determined to be in the active mode and the system further performs operations comprising alerting a respective one of the plurality of users immediately after the brain monitoring sensor detects a current drop of the one or more drops in the attentiveness level.

7. The computer program product of claim 6, wherein the inattentiveness information associated with the one or more drops in the attentiveness level is stored in a database and comprises one or more of times that respective ones of the one or more drops occurred, one or more durations of respective ones of the one or more drops, and one or more topics of the learning session during which respective ones of the one or more drops occurred, wherein the stored data for a respective drop the inattentiveness information includes the time, duration and topic.

8. The computer program product of claim 6 wherein the at least one processor further performs operations comprising: generating one or more suggested actions to the respective one of the plurality of users; and providing the one or more suggested actions to the respective one of the plurality of users.

9. The computer program product of claim 6, wherein the at least one processor further performs operations comprising:
   determining that the system is in the passive mode;
   anonymizing the inattentiveness information;
   aggregating the anonymized inattentiveness information associated with the one or more drops in the attentiveness level associated with the plurality of users;
   using the anonymized inattentiveness information to identify points in the learning session when multiple users were inattentive;
   determining that the learning session has ended; and
   after the learning session has ended, generating and sending a report that includes the anonymized inattentiveness information and the identified points.

10. The computer program product of claim 6, wherein the at least one processor further performs operations comprising:
    determining that the system is in the active mode;
    determining that a threshold number of users have a current drop in attentiveness level; and
    responsive to determining that the threshold number of users have a current drop in attentiveness level, automatically and immediately sending an alert to a user conducting the learning session that includes one or more suggestions for improving attentiveness levels.

11. A computer-implemented method for conducting a computer based presentation, the method comprising:
    receiving sensor input from a plurality of geographically distributed client devices, each client device including a sensor for measuring attentiveness of a respective one of a plurality of users, by a system comprising at least one processor and a computer readable storage medium having program instructions embodied therewith;
    by the system, using measurements provided by respective sensors of the plurality of geographically distributed client devices for determining respective attentiveness levels each associated with respective ones of the plurality of users during a learning session; determining one or more drops in the attentiveness levels of at least one of the plurality of users during the learning session;
    tracking inattentiveness information associated with the one or more drops in the attentiveness levels;
    determining whether the system is in either a passive mode or an active mode; and
    automatically sending one or more corrective actions to at least one client device in response to the determination of the one or more drops in the attentiveness levels, the inattentiveness information and the determination whether the system is in a passive mode or in an active mode, wherein a timing of the corrective action is dependent on whether the system is in the passive or active mode,
    conducting the learning session on a second client device including one of an augmented reality device or a virtual reality device equipped with a brain monitoring sensor;
    determining that the system is in the active mode; and
    automatically and immediately alerting a respective one of the plurality of users once the brain monitoring sensor detects a current drop of the one or more drops in the attentiveness level.

12. The method of claim 11, wherein the inattentiveness information associated with the one or more drops in the attentiveness level is stored in a database and comprises one or more of times that respective ones of the one or more drops occurred, one or more durations of respective ones of the one or more drops, and one or more topics of the learning session during which respective ones of the one or more drops occurred, wherein the stored data for a respective drop the inattentiveness information includes the time, duration and topic.

13. The method of claim 11, further comprising:
generating one or more suggested actions to the respective one of the plurality of users; and
providing the one or more suggested actions to the respective one of the plurality of users.

14. The method of claim 11, further comprising:
determining that the system is in the passive mode;
anonymizing the inattentiveness information;
aggregating the anonymized inattentiveness information associated with the one or more drops in the attentiveness level associated with the plurality of users;
using the anonymized inattentiveness information to identify points in the learning session when multiple users were inattentive;
determining that the learning session has ended; and
after the learning session has ended, generating a report that includes the anonymized inattentiveness information and the identified points.

15. The method of claim 11, wherein the learning session is prerecorded, the method further comprising:
determining that the system is in the active mode;
playing the prerecorded learning session;
determining a drop in the attentiveness level of a user of a second client device; and
responsible to determining the drop, automatically and immediately sending a message offering to playback the learning session as one of the one more corrective actions to the second client device.

16. The method of claim 11, further comprising:
determining that the system is in passive mode
determining one or more drops in the attentiveness level of a user of a second client device during the first learning session;
determining that the learning session has ended; and
after the learning session has ended, sending a report enabling the user of the second client device to provide feedback on the learning session or specific parts of the learning session during the one or more drops in the attentiveness level.

17. The method of claim 11, wherein the learning session is a first learning session conducted by the system, the method further comprising:
determining that the system is in passive mode;
conducting the first learning session of a first version of a course;
determining one or more drops in the attentiveness level of users of client devices in the determined passive mode during the first learning session;
conducting a second learning session of a second version of the course;
determining one or more drops in the attentiveness level of users of client devices in the determined passive mode during the second learning session;
determining that the first and second learning sessions have ended; and
after the first and second learning session has ended, comparing the one or more drops of attentiveness level during the first learning session and the one or more drops of attentiveness level during the second learning session to determine which version of the course is more successful in engaging user attention.

* * * * *